United States Patent
Abe et al.

(10) Patent No.: US 10,308,143 B2
(45) Date of Patent: Jun. 4, 2019

(54) CONVEYANCE SEAT

(71) Applicant: TS TECH CO., LTD., Asaka-shi, Saitama (JP)

(72) Inventors: Ryuzaburo Abe, Tochigi (JP); Takayoshi Katori, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/748,872

(22) PCT Filed: Jul. 29, 2016

(86) PCT No.: PCT/JP2016/072368
§ 371 (c)(1),
(2) Date: Jan. 30, 2018

(87) PCT Pub. No.: WO2017/022677
PCT Pub. Date: Feb. 9, 2017

(65) Prior Publication Data
US 2018/0229624 A1    Aug. 16, 2018

(30) Foreign Application Priority Data

Aug. 3, 2015  (JP) .................................. 2015-153652

(51) Int. Cl.
  *B60N 2/02*    (2006.01)
  *B60N 2/72*    (2006.01)
  *A47C 7/14*    (2006.01)

(52) U.S. Cl.
  CPC .............. *B60N 2/0284* (2013.01); *A47C 7/14* (2013.01); *B60N 2/02* (2013.01); *B60N 2/72* (2013.01)

(58) Field of Classification Search
  CPC ............ B60N 2/0284; B60N 2/72; A47C 7/14
  (Continued)

(56) References Cited

U.S. PATENT DOCUMENTS 5,588,708 A  *  12/1996  Rykken .................. A47C 7/506
                                                      297/284.11
6,419,317 B1 *   7/2002  Westrich .............. B60N 2/0284
                                                      297/284.11
(Continued)

FOREIGN PATENT DOCUMENTS

JP    H10-113248 A    5/1998
JP    2003-002090 A    1/2003
(Continued)

OTHER PUBLICATIONS

Office Action issued in related application JP 2015-153652, dated Apr. 16, 2019, with machine generated English language translation, 7 pages.

*Primary Examiner* — Milton Nelson, Jr.
(74) *Attorney, Agent, or Firm* — Drinker Biddle & Reath LLP

(57) ABSTRACT

In a vehicle seat including an adjustment device configured to move a front end of a seat cushion to adjust the length of the seat cushion in a front-to-back direction, the adjustment device has a support portion movable back and forth relative to a seat cushion frame, and a roller portion rotatably supported by the support portion and configured such that a pad material is wound around an outer peripheral portion at a front end portion of the seat cushion. The length of the seat cushion is adjustable by a change in an amount of winding of the pad material around the outer peripheral portion corresponding to a rotation of the roller portion during front-to-back movement of the support portion. The outer peripheral portion of the roller portion is made of a soft material.

11 Claims, 8 Drawing Sheets

(58) Field of Classification Search
USPC .................................................. 297/284.11
See application file for complete search history.

(56)     References Cited

U.S. PATENT DOCUMENTS

| | | | | |
|---|---|---|---|---|
| 6,454,353 | B1* | 9/2002 | Knaus | A47C 1/023 |
| | | | | 297/284.11 |
| 6,837,540 | B2* | 1/2005 | Yamaguchi | B60N 2/4221 |
| | | | | 297/216.1 |
| 7,597,398 | B2* | 10/2009 | Lindsay | B60N 2/0224 |
| | | | | 297/283.2 |
| 8,011,728 | B2* | 9/2011 | Kohl | B60N 2/0284 |
| | | | | 297/284.11 |
| 8,128,167 | B2* | 3/2012 | Zhong | B60N 2/62 |
| | | | | 297/284.11 |
| 2002/0113473 | A1 | 8/2002 | Knaus | |
| 2008/0157577 | A1 | 7/2008 | Lindsay | |
| 2009/0195041 | A1 | 8/2009 | Ito et al. | |
| 2011/0006573 | A1 | 1/2011 | Arakawa et al. | |

FOREIGN PATENT DOCUMENTS

| | | |
|---|---|---|
| JP | 2005-305110 A | 11/2005 |
| JP | 2009-179192 A | 8/2009 |
| JP | 2011-015867 A | 1/2011 |
| JP | 2014-162341 A | 9/2014 |

* cited by examiner

CONVEYANCE SEAT

CROSS REFERENCE TO RELATED APPLICATIONS

This application is a National Stage Entry application of PCT Application No. PCT/JP2016/072368, filed Jul. 29, 2016, which claims the priority benefit of Japanese Patent Application No. JP 2015-153652, filed Aug. 3, 2015, the contents being incorporated herein by reference.

BACKGROUND

The present disclosure relates to a conveyance seat, and particularly relates to a conveyance seat configured for movement of a front end of a seat cushion to adjust the length of the seat cushion in a front-to-back direction.

Among conveyance seats, some seats are configured for movement of a front end of a seat cushion to adjust the length of the seat cushion in a front-to-back direction in accordance with the body type of a seated person. An example of such a seat is a device described in Japanese Patent Publication JP 2009-179192 A.

The device described in Japanese Patent Publication JP 2009-179192 A is a seat cushion adjustment device having a base member forming a framework of a seat cushion, a seating member supported by the base member to form the outer shape of the seat cushion, a deformed drum configured to lock a front end portion of the seating member, a movement mechanism configured to move the deformed drum relative to the base member in a seat front-to-back direction, and a lever configured to adjust the outer shape of the seat cushion. In the seat cushion adjustment device with such a configuration, the movement mechanism is rotatably supported by the deformed drum, and one end portion and the other end portion of the lever are rotatably coupled respectively to the base member and the deformed drum. When the deformed drum is moved relative to the base member in the seat front-to-back direction by the movement mechanism, the front end portion of the seating member is accordingly moved by rotation of the deformed drum by the lever. This adjusts the outer shape of the seat cushion.

In the configuration of moving the front end of the seat cushion to adjust the length of the seat cushion in the front-to-back direction, a drive mechanism for performing such movement operation is provided in the front end portion of the seat cushion. It is required for the seat cushion including such a drive mechanism therein that influence of the above-described drive mechanism on the quality (seating comfortability and a seating feeling) of the seat cushion is reduced.

When the front end of the seat cushion is moved, a pad material and a skin material are accordingly moved in and out (retracted and extended) at the front end portion of the seat cushion. A favorable outer appearance of a portion where the pad material and the skin material are moved in and out is desirably provided.

SUMMARY

The present disclosure has been made in view of the above-described problem, and various embodiments provide, as a conveyance seat capable of moving a front end of a seat cushion to adjust the length of the seat cushion, a conveyance seat configured so that the quality of a seat cushion can be ensured and a favorable outer appearance is provided.

The above-described problem is solved by various embodiments of a conveyance seat of the present disclosure. In an embodiment, the conveyance seat is a conveyance seat including a seat cushion having a pad material placed on a frame, and an adjustment device configured to move a front end of the seat cushion to adjust a length of the seat cushion in a front-to-back direction. The adjustment device has a support portion attached to be movable relative to the frame in the front-to-back direction, and a roller portion rotatably supported by the support portion and configured such that the pad material is wound around an outer peripheral portion of the roller portion at a front end portion of the seat cushion. The length of the seat cushion is adjustable by a change in an amount of winding of the pad material around the outer peripheral portion corresponding to a rotation of the roller portion during movement of the support portion in the front-to-back direction. The outer peripheral portion is made of a soft material.

In the conveyance seat of the present disclosure configured as described above, the outer peripheral portion of the roller portion around which the pad material is wound at the front end portion of the seat cushion is made of the soft material. Normally, the lower thighs of a seated person are placed on the front end portion of the seat cushion. At the front end portion of the seat cushion on which the lower thighs of the seated person are placed, the outer peripheral portion of the roller portion disposed in such a front end portion is made of the soft material. Thus, the quality (a feeling of seating comfort) of the front end portion of the seat cushion is ensured. Moreover, the outer peripheral portion of the roller portion is made of the soft material, and therefore, the pad material can be favorably wound by a friction force acting on the outer peripheral portion. This can maintain a favorable outer appearance. As described above, according to the conveyance seat of the present disclosure, the quality of the seat cushion (particularly, the front end portion) can be ensured while a favorable outer appearance can be provided.

Moreover, in the above-described conveyance seat, the adjustment device may have a link mechanism configured to rotate the roller portion in response to movement of the support portion. The link mechanism may have a first link connected to a rotary shaft of the roller portion and configured to rotate the rotary shaft, and a second link fixed to a lower portion of the frame of the seat cushion and configured to, in association with the movement of the support portion to, operate the first link to rotate the rotary shaft. In the above-described configuration, the link mechanism can rotate the roller portion such that the amount of winding of the pad material around the outer peripheral portion is freely adjusted.

Further, in the above-described conveyance seat, the first link may be disposed lower than an upper end of the roller portion. The above-described configuration can suppress the feeling of seating comfort from diminishing due to contact of the first link with the seated person.

In addition, in the above-described conveyance seat, the first link may be disposed lower than an upper end of the rotary shaft. The above-described configuration can more efficiently suppress the feeling of seating comfort from diminishing due to contact of the first link.

Moreover, in the above-described conveyance seat, the seat cushion may have a skin material configured to cover the pad material. The roller portion may be configured such that the pad material and the skin material are wound around the outer peripheral portion at the front end portion. A skin fixing portion for fixing an end portion of the skin material may be attached to the rotary shaft of the roller portion. In the above-described configuration, the end portion of the skin is fixed to the skin fixing portion so that a favorable outer appearance of the skin can be maintained. Further, the skin fixing portion is attached by means of the rotary shaft of the roller portion, and therefore, an increase in the number of components can be suppressed without the need for separately providing a member for attachment of the skin fixing portion.

Further, in the above-described conveyance seat, the skin fixing portion may be a wire provided for fixing the end portion with the end portion being hooked, and the wire may be disposed lower than the rotary shaft. In the above-described configuration, the skin fixing portion includes the wire, and therefore, the end portion of the skin can be fixed with a relatively simple configuration.

In addition, in the above-described conveyance seat, the adjustment device may have a biasing member configured to bias, in the rotation direction of the roller portion, the roller portion in the direction of increasing the amount of winding of the pad material around the outer peripheral portion. In the above-described configuration, the roller portion is biased by the biasing member, and therefore, appropriate tension is applied to the pad material wound around the outer peripheral portion of the roller portion. As a result, a more favorable outer appearance of the front end portion of the seat cushion is provided.

Moreover, in the above-described conveyance seat, the outer peripheral portion may be made of resin foam as the soft material. In the above-described configuration, the outer peripheral portion of the roller portion is made of the resin foam, and therefore, the relatively-lightweight roller portion can be implemented.

Further, in the above-described conveyance seat, the adjustment device may have a cover member configured to cover at least a portion of the roller portion. The cover member may be fastened to the support portion, and may be movable together with the support portion when the support portion moves. In the above-described configuration, the roller portion is covered with the cover member. Thus, e.g., adherence of a foreign substance to the roller portion can be reduced while a more favorable outer appearance of the periphery of the roller portion can be provided.

In addition, in the above-described conveyance seat, the cover member may have a front wall portion positioned at the front of the pad material wound around the outer peripheral portion and covering the pad material, and a side wall portion that laterally covers a side end surface of the roller portion. In the above-described configuration, the front and side of the roller portion are covered with the cover member, and therefore, adherence of the foreign substance to the roller portion can be more effectively reduced.

According to the present disclosure, in the conveyance seat configured to move the front end of the seat cushion to adjust the length of the seat cushion, the quality of the seat cushion (particularly, the front end portion) can be ensured while a favorable outer appearance can be provided. Moreover, according to the present disclosure, the link mechanism can rotate the roller portion such that the amount of winding of the pad material around the outer peripheral portion is freely adjusted. Further, the present disclosure can suppress the feeling of seating comfort from diminishing due to contact of the first link as a component of the link mechanism with the seated person. In addition, the present disclosure can more efficiently suppress the feeling of seating discomfort due to contact of the first link. Moreover, according to the present disclosure, the end portion of the skin is fixed to the skin fixing portion so that a favorable outer appearance of the skin can be maintained. Further, the skin fixing portion is attached by means of the rotary shaft of the roller portion, and therefore, it is not necessary to separately provide the member for attachment of the skin fixing portion. In addition, according to the present disclosure, the skin fixing portion includes the wire, and therefore, the end portion of the skin can be fixed with a relatively simple configuration. Moreover, according to the present disclosure, appropriate tension is applied to the pad material wound around the outer peripheral portion of the roller portion. As a result, a more favorable outer appearance of the front end portion of the seat cushion is provided. Further, according to the present disclosure, the relatively lightweight roller portion can be implemented. In addition, according to the present disclosure, e.g., adherence of the foreign substance to the roller portion can be reduced while a more favorable outer appearance of the periphery of the roller portion can be provided. Moreover, according to the present disclosure, adherence of the foreign substance to the roller portion can be more effectively reduced.

BRIEF DESCRIPTION OF DRAWINGS

Various embodiments of the invention are illustrated in the drawings, in which.

DETAILED DESCRIPTION

An embodiment (the present embodiment) of the present disclosure is described below. Note that a vehicle seat is described below as an example of a conveyance seat of the present embodiment. Note that the conveyance seat of the present disclosure is not limited only to the vehicle seat, and may be seats mounted on conveyances other than vehicles, such as seats mounted on ships and airplanes. Moreover, the embodiment described below is set forth as an example for the sake of easy understanding of the present disclosure, and is not intended to limit the present disclosure. That is, changes and modifications can be made to the present disclosure without departing from the gist of the present disclosure, and needless to say, the present disclosure includes equivalents thereof.

Moreover, in description below, a "front-to-back direction" is a front-to-back direction when viewed from a seated person, and is a direction coincident with a vehicle traveling direction. Further, a "seat width direction" is a transverse width direction of the vehicle seat, and corresponds to a right-to-left direction when viewed from the seated person. In addition, an "upper-to-lower direction" is an upper-to-lower direction with the vehicle seat being mounted in the vehicle, and in other words, is a seat height direction.

Figure 1:
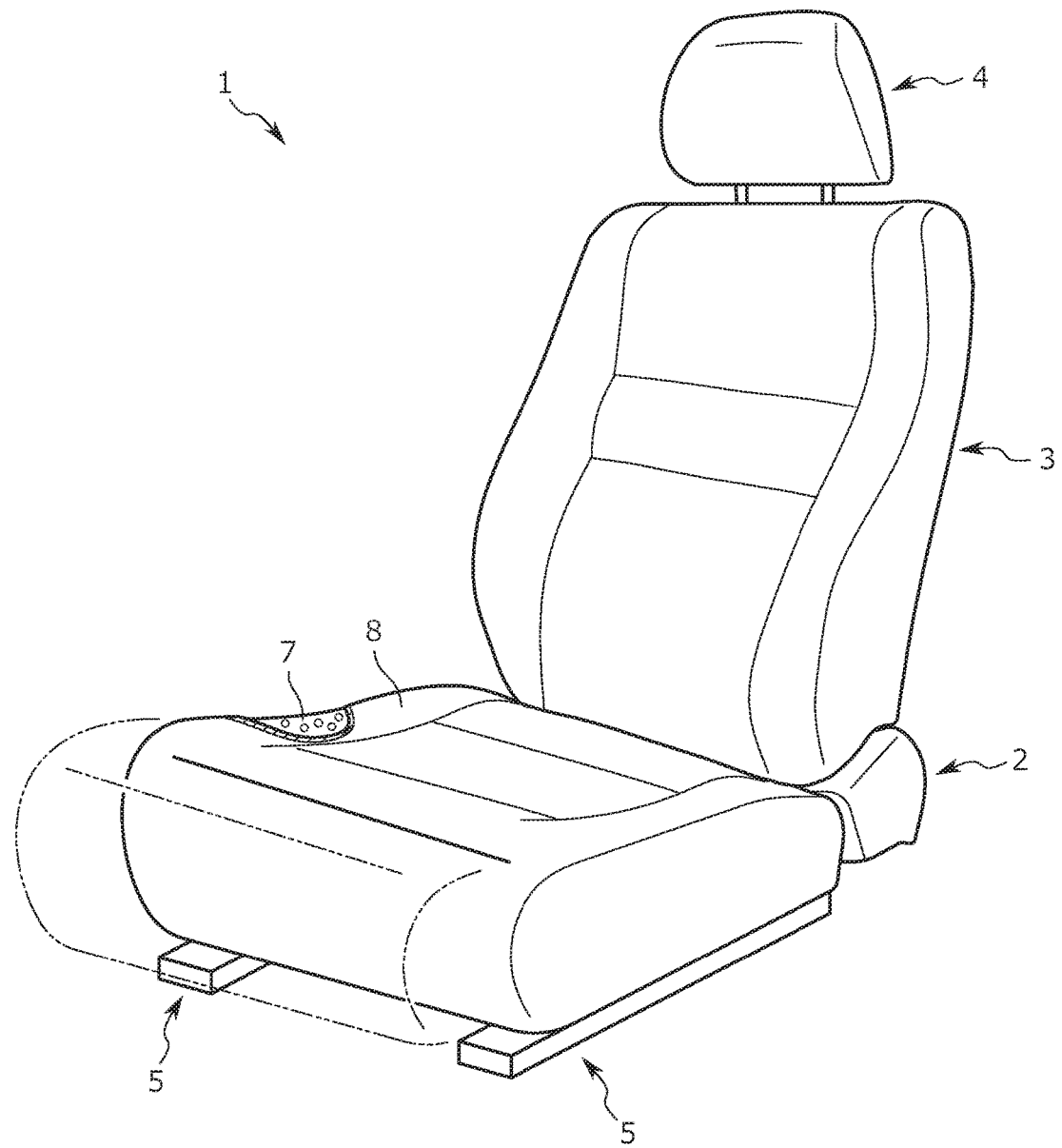
FIG. 1 is a perspective view of a conveyance seat of an embodiment of the present disclosure.

First, a configuration of a vehicle seat 1 of the present embodiment is described with reference to FIG. 1. The vehicle seat 1 of the present embodiment includes, as illustrated in FIG. 1, a seat cushion 2, a seat back 3, and a head rest 4. Moreover, the vehicle seat 1 of the present embodiment is movable in the front-to-back direction (the vehicle traveling direction) by slide rail mechanisms 5 placed on a lower portion of the seat.

A configuration of the seat cushion 2 is described. The seat cushion 2 is configured such that a pad material 7 made of urethane or the like is placed on a seat cushion frame 6 as a frame and the surface of the pad material 7 is covered with a skin material 8. Moreover, an adjustment device 9 (described below) is disposed in the seat cushion 2. A front end portion of the seat cushion 2 can be moved in the front-to-back direction by the adjustment device 9. The front end portion of the seat cushion 2 is moved as described above so that the length (hereinafter merely referred to as the "length of the seat cushion 2") of the seat cushion 2 in the front-to-back direction can be adjusted.

With the above-described adjustment function, the length of the seat cushion 2 can be, in the vehicle seat 1 of the present embodiment, changed according to the body type of the seated person, and the seat cushion 2 can be extended to, e.g., a position indicated by a dashed line of FIG. 1.

Figure 6:
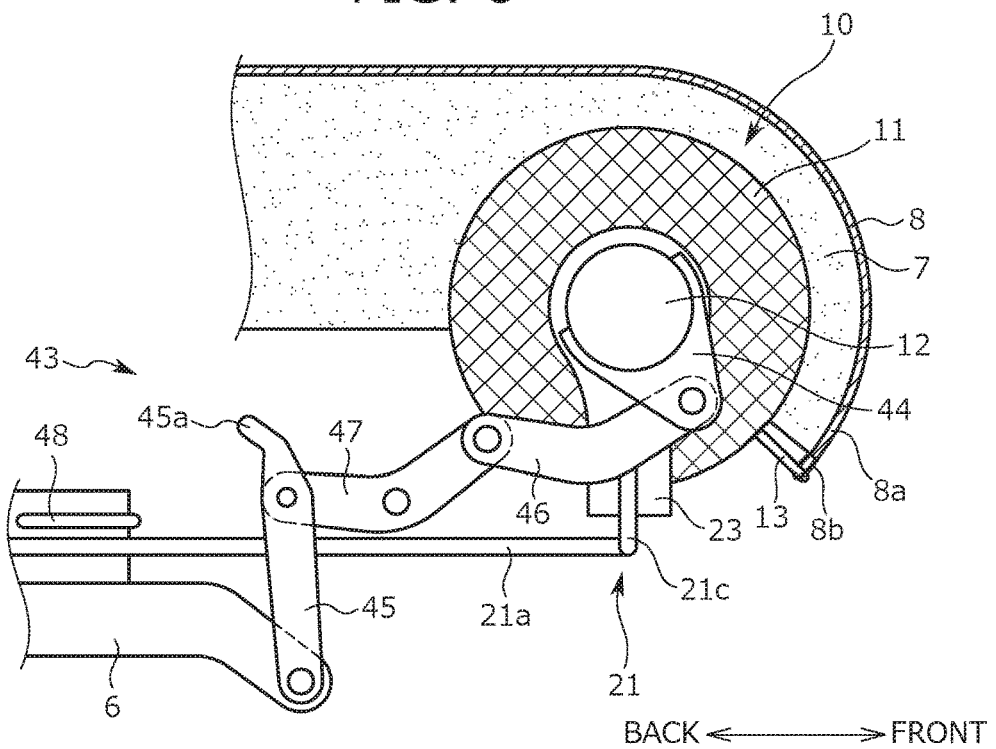
FIG. 6 is a partial, side view of the states of the roller portion and the link mechanism when the seat cushion front end portion is positioned at a front end portion of the movable area, according to an embodiment.
Figure 7:
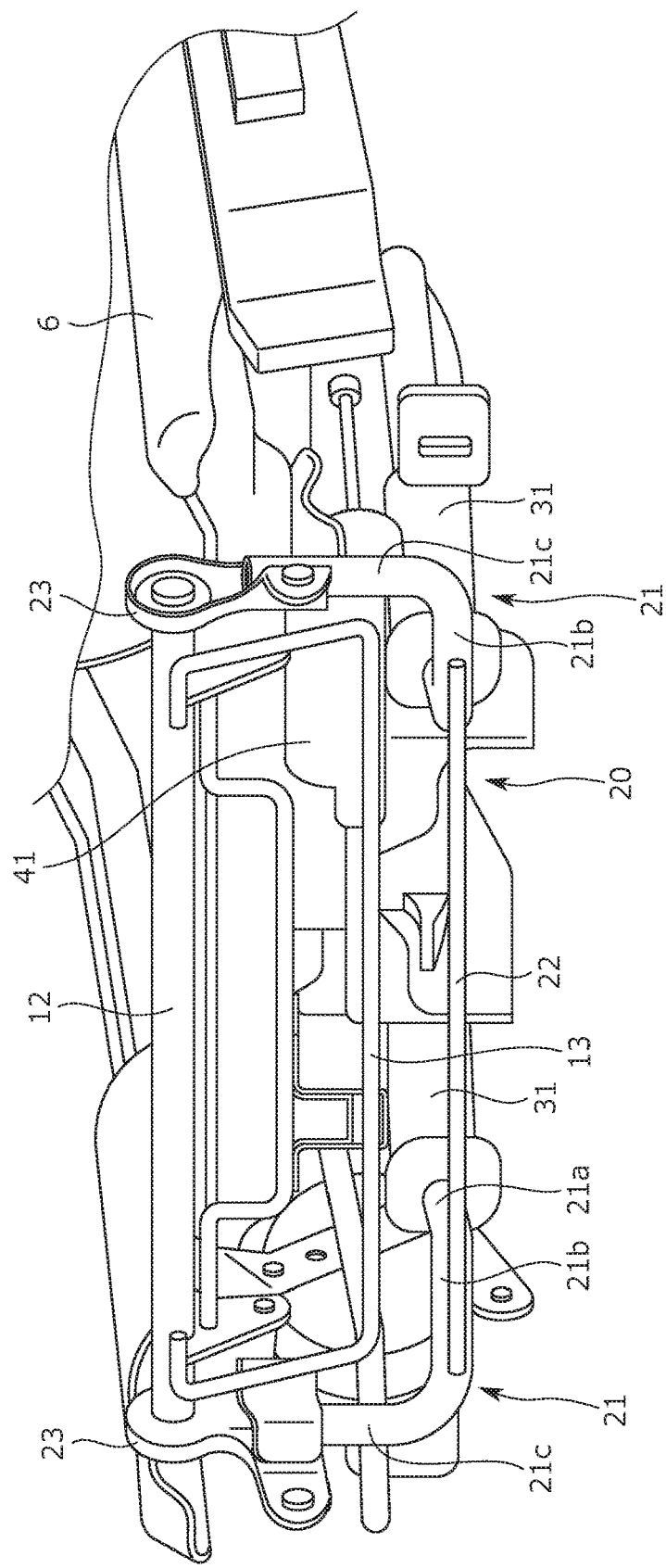
FIG. 7 is a partial, perspective view of a support structure of a rotary shaft of the roller portion, according to an embodiment.

Next, a configuration of the adjustment device 9 is described. As described above, the adjustment device 9 is configured to move a front end of the seat cushion 2 to adjust the length of the seat cushion 2, and is disposed in a front end portion of the seat cushion 2. The adjustment device 9 of the present embodiment includes a roller portion 10 illustrated in FIG. 2 etc., a support portion 20 illustrated in FIG. 7 etc., a holding portion 30 illustrated in FIG. 4 etc., a drive portion 40, and a cover member 50 illustrated in FIG. 2. Components of the adjustment device 9 are described below with reference to FIGS. 2 to 7. Note that for the sake of convenience of description, the components of the adjustment device 9 are mainly illustrated in FIGS. 2 to 7, and, e.g., peripheral units thereof (e.g., other units attached to the seat cushion frame) are not shown in the figures. Moreover, FIG. 7 is a view in a state in which an outer peripheral portion 11 of the roller portion 10 is detached.

Figure 2:
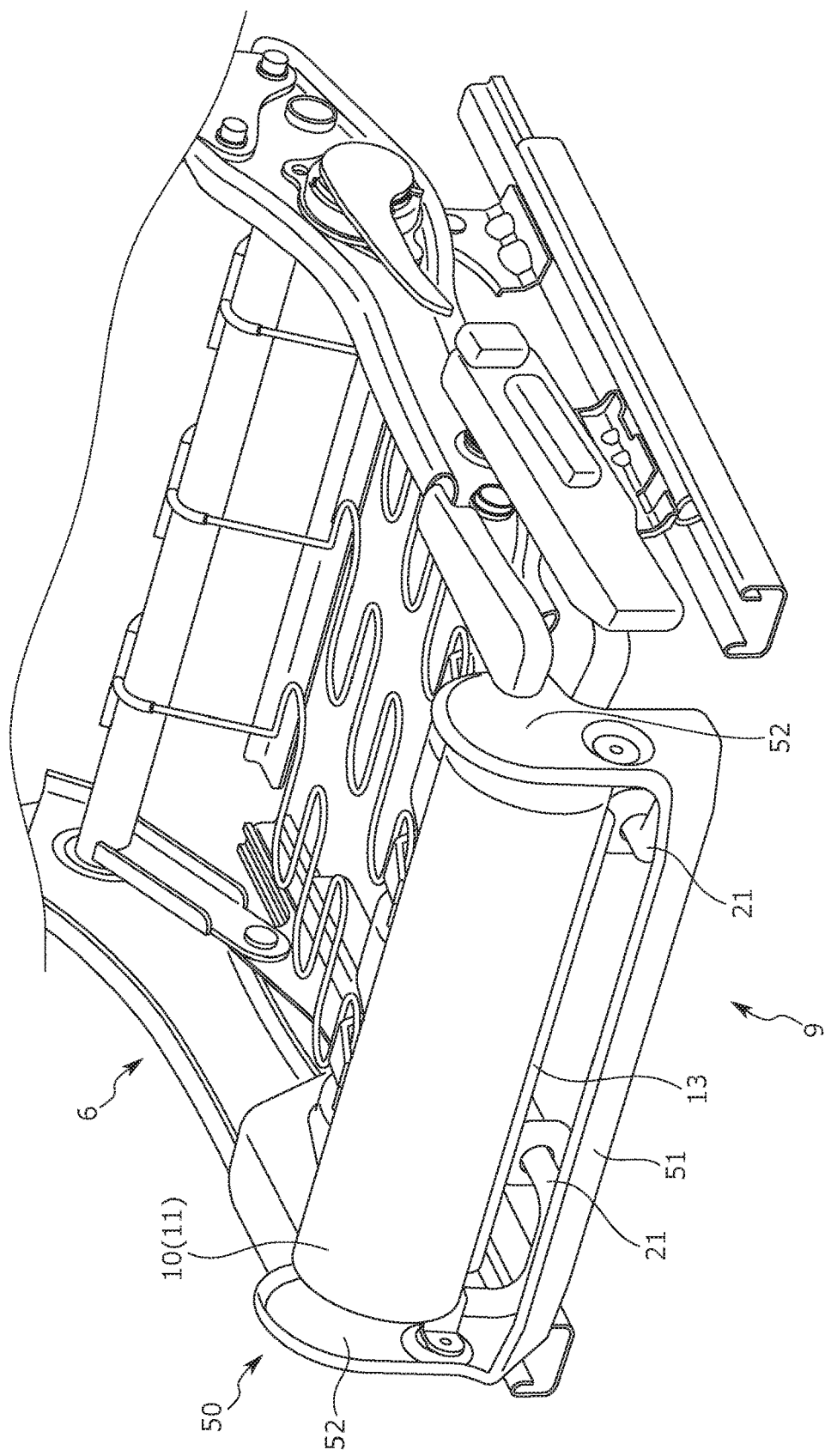
FIG. 2 is a partial, perspective view of a seat cushion frame and an adjustment device, according to an embodiment.
Figure 5:
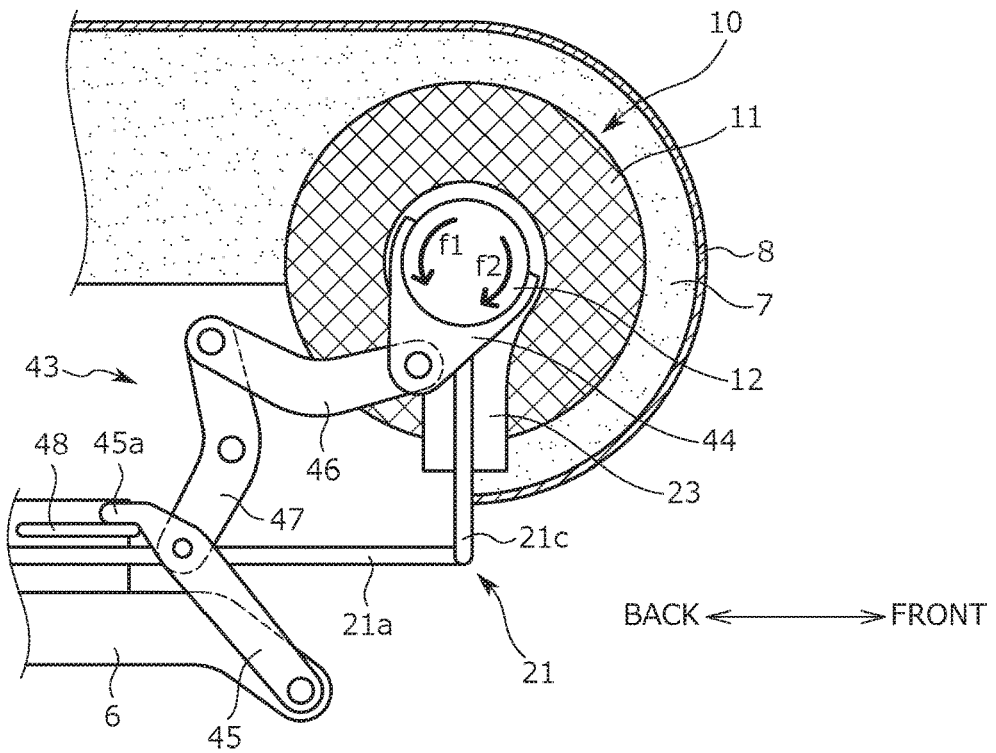
FIG. 5 is a partial, side view of states of a roller portion and a link mechanism when a seat cushion front end portion is positioned at a back end position of a movable area, according to an embodiment.

As illustrated in FIG. 2, the roller portion 10 is disposed on the front side with respect to a front end of the seat cushion frame 6. Moreover, as illustrated in FIGS. 5 and 6, the roller portion 10 is configured such that the pad material 7 and the skin material 8 are wound around the outer peripheral portion 11 at the front end portion of the seat cushion 2. Further, the roller portion 10 has a rotary shaft 12 (FIG. 3) forming a core. The rotary shaft 12 extends in the seat width direction, and is rotatably supported by the support portion 20. When the rotary shaft 12 rotates, the outer peripheral portion 11 of the roller portion 10 rotates together. When the outer peripheral portion 11 rotates, an amount of winding of each of the pad material 7 and the skin material 8 around the outer peripheral portion 11 changes. Note that in the present embodiment, the outer peripheral portion 11 is made of a soft material, more specifically resin foam such as urethane.

A skin fixing portion 13 for fixing an end portion 8a of the skin material 8 wound around the outer peripheral portion 11 is attached to the rotary shaft 12. The skin fixing portion 13 includes a wire bent in a substantially U-shape illustrated in FIG. 7. This wire is disposed lower than the rotary shaft 12. More specifically, the wire forming the skin fixing portion 13 is welded to the rotary shaft 12 at both end portions of the wire in an extension direction thereof. Moreover, the above-described wire is bent at the side of each portion welded to the rotary shaft 12, and then, extends to the outside of the outer peripheral portion 11 through a cut formed in the outer peripheral portion 11. Of the above-described wire, the portion present on the outside of the outer peripheral portion 11 further extends along the seat width direction. The end portion 8a of the skin material 8 is fixed to such a portion of the skin fixing portion 13 extending along the seat width direction. Specifically, a trim loop 8b fastened to the end portion 8a is locked as illustrated in FIG. 6.

Figure 3:
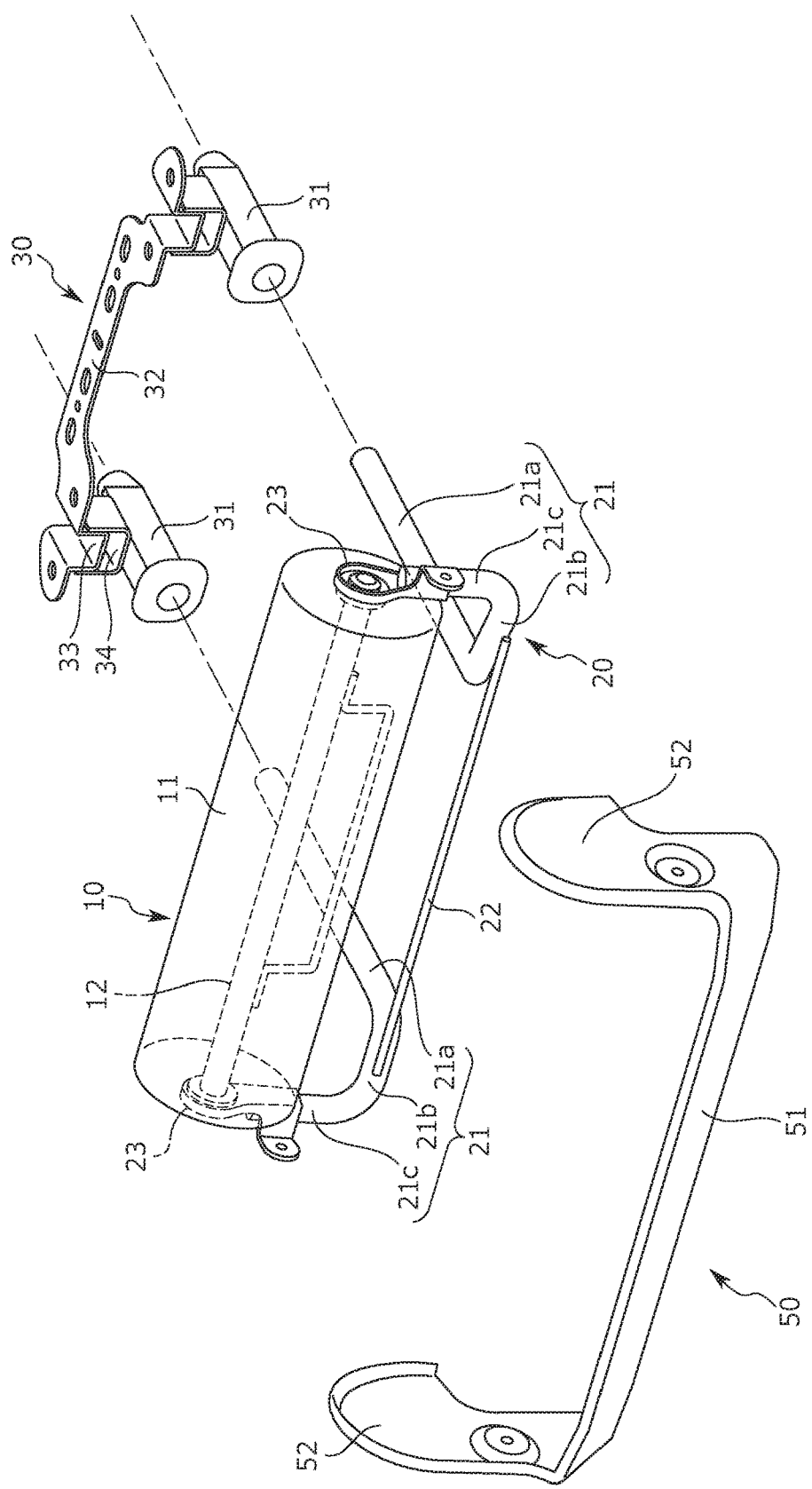
FIG. 3 is an exploded view of some of components of the adjustment device of FIG. 2, according to an embodiment.

The support portion 20 is configured to support the roller portion 10 (in a precise sense, the rotary shaft 12 of the roller portion 10). The support portion 20 is attached with the support portion 20 being movable relative to the seat cushion frame 6 in the front-to-back direction. That is, the support portion 20 is equivalent to a movable portion configured to move in the front-to-back direction. The support portion 20 includes a pair of right and left extension members 21 (configured to advance and retract) illustrated in FIG. 3, a communication member 22 for communication between the extension members 21, and rotary shaft support brackets 23 illustrated in FIG. 7. The pair of extension members 21 include metal or resin rod bodies, and are provided respectively at positions separated from each other in the seat width direction. As illustrated in FIG. 3, each extension member 21 has a body portion 21a elongated along the front-to-back direction, a horizontal portion 21b being adjacent to a front end portion of the body portion 21a and extending outward in the seat width direction, and an upwardly-extending vertical portion 21c adjacent to an outer end portion of the horizontal portion 21b in the seat width direction.

The communication member 22 extends in the seat width direction for communication between the horizontal portion 21b of the left extension member 21 and the horizontal portion 21b of the right extension member 21, and includes a wire, for example. Each rotary shaft support bracket 23 is welded to an upper end portion of the vertical portion 21c of a corresponding one of the extension members 21, and rotatably supports an end portion of the rotary shaft 12 of the roller portion 10 in an axial direction thereof.

Figure 4:
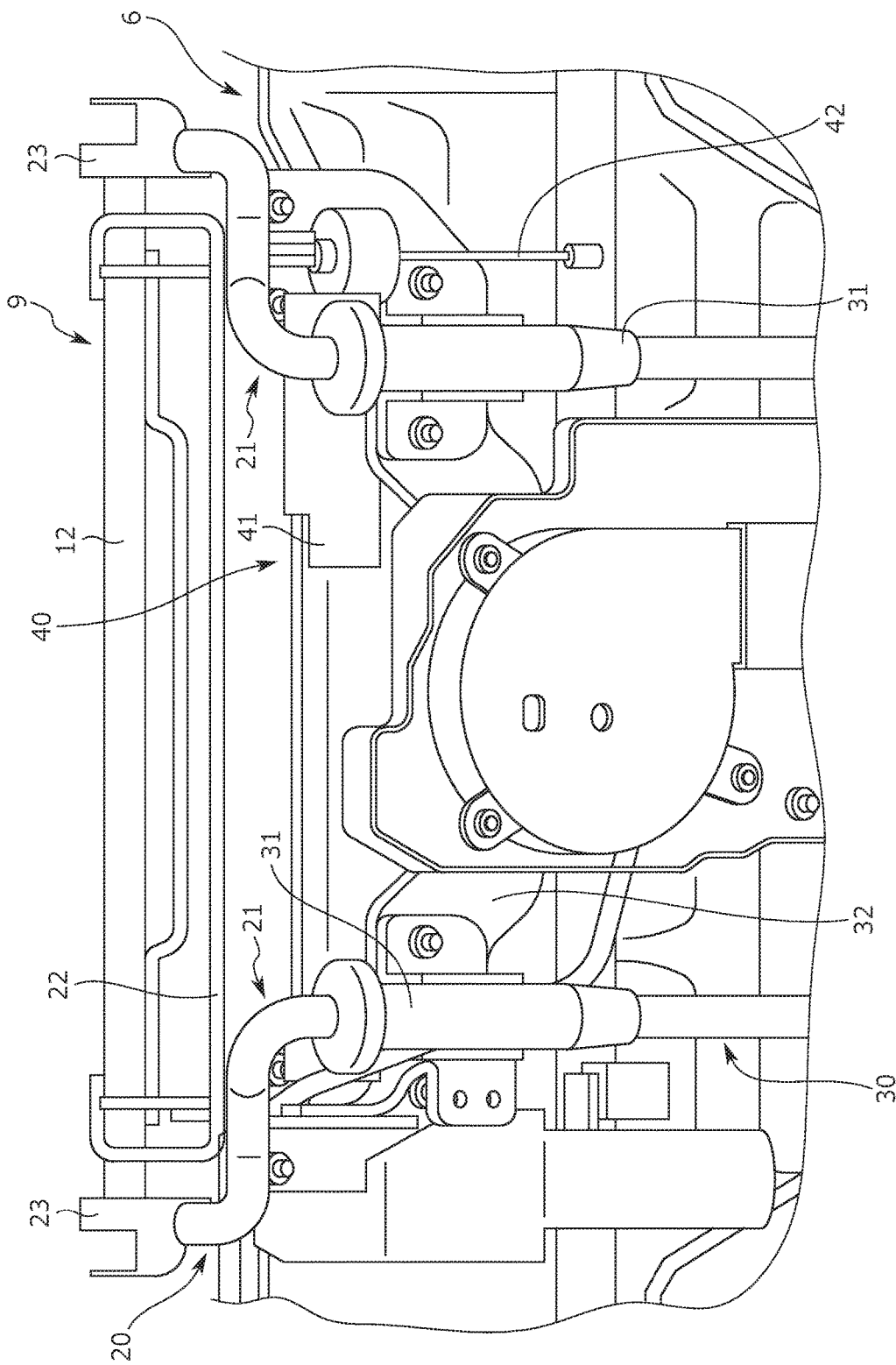
FIG. 4 is a partial, schematic view of a front end portion of the seat cushion frame of FIG. 2 from below, according to an embodiment.

The holding portion 30 is configured to movably hold the support portion 20 with the holding portion 30 being fixed to the seat cushion frame 6. As illustrated in FIG. 4, the holding portion 30 is fixed to a lower front end portion of the seat cushion frame 6. Moreover, the holding portion 30 includes a pair of right and left guide members 31 as illustrated in FIGS. 3 and 4. Each guide member 31 is a substantially tubular member elongated along the front-to-back direction, and each extension member 21 is inserted into a corresponding one of the guide members 31 with the extension member 21 being extendable along the front-to-back direction. Moreover, each guide member 31 is disposed at the position of a corresponding one of the extension members 21 in the seat width direction. That is, in the present embodiment, two sets of the guide member 31 and the extension member 21 are provided respectively at positions separated from each other in the seat width direction.

Note that a structure including the guide member 31 and the extension member 21 is configured to allow advancement/retraction of the extension member 21 in the front-to-back direction and to suitably restrict other types of movement. As an example, a structure similar to a pillar portion of a general head rest and a pillar guide member into which the pillar portion is inserted can be utilized as the structure including the guide member 31 and the extension member 21.

Note that in the present embodiment, a small cavity is, as illustrated in FIG. 4, formed between the guide members 31 at a lower portion of the seat cushion frame 6, the pair of guide members 31 being arranged at the lower portion of the seat cushion frame 6. With utilization of such a cavity, units to be built into the seat cushion 2 can be arranged, and in the example illustrated in FIG. 4, a blower device configured to send air into the seat cushion 2 or a member forming an air sending path is disposed in the cavity.

The holding portion 30 further includes a coupling member 32 illustrated in FIG. 3. The coupling member 32 includes a metal thin plate subjected to bending, and extends in the seat width direction to couple the pair of right and left guide members 31 together. Moreover, the holding portion 30 is fixed to the lower portion of the seat cushion frame 6 through the coupling member 32. That is, in the present embodiment, the pair of right and left guide members 31 is not fixed to the seat cushion frame 6 one by one, but is assembled with the coupling member 32 and then fixed as a unit. Thus, when the holding portion 30 (specifically, the guide members 31) is installed to the seat cushion frame 6, such installation is efficiently performed.

Of the coupling member 32, a portion (a guide member fixing portion 33) fixed to each guide member 31 overlaps with a reinforcement member 34 as illustrate in FIG. 3, and therefore, the guide member fixing portion 33 is suitably reinforced. The structure for fixing, including the coupling member 32, the reinforcement members 34, etc., the guide members 31 to the seat cushion frame 6 is described below in detail.

The drive portion 40 is operable to move, in the front-to-back direction, the support portion 20 supporting the roller portion 10. The drive portion 40 includes a drive motor 41 and a spindle 42 as illustrated in FIG. 4, as well as including a link mechanism 43 illustrated in FIGS. 5 and 6. The drive motor 41 serves as a power source for the drive portion 40, and is fixed to a front end portion of the seat cushion frame 6. As described above, the drive portion 40 of the present embodiment is configured to move the support portion 20 back and forth by means of the power of the drive motor 41. Note that the present disclosure is not limited to such a configuration, and a configuration of manually moving the support portion 20 without use of the drive motor 41, such as a configuration of operating an operation lever etc. by a person seated on the seat to move the support portion 20 back and forth by movement of the lever, may be employed in other embodiments.

The spindle 42 is a member configured to receive a drive force of the drive motor 41 to move in the front-to-back direction, and in the present embodiment, includes a screw-type elongated rod body. The spindle 42 is supported with the spindle 42 being movable in the front-to-back direction at the front end portion of the seat cushion frame 6. Moreover, one end portion of the spindle 42 is fixed to a predetermined portion of the seat cushion frame 6, and the other end portion of the spindle 42 is fixed to a predetermined portion of the support portion 20, such as one of the extension members 21. Thus, when the spindle 42 moves back and forth, the pair of right and left extension members 21 moves in the front-to-back direction.

The link mechanism 43 is configured to rotate the roller portion 10 in response to front-to-back movement of the support portion 20. More specifically, the link mechanism 43 includes a plurality of links, and each link operates in association with front-to-back movement of the support portion 20. In this state, one of the links of the link mechanism 43 operates (performs a rotatable movement operation) to rotate the rotary shaft 12 with the link being connected to the rotary shaft 12 of the roller portion 10. Thus, the roller portion 10 rotates (in a precise sense, rotatably moves) together with the rotary shaft 12 in response to front-to-back movement of the support portion 20.

A configuration of the link mechanism 43 of the present embodiment is specifically described. As illustrated in FIGS. 5 and 6, a first link 44, a second link 45, and intermediate links 46, 47 form the link mechanism 43. The first link 44 is a lever-shaped link connected to the rotary shaft 12 of the roller portion 10, and rotates together with the rotary shaft 12. The second link 45 is an arm-shaped link swingably supported by a shaft provided at the lower portion of the seat cushion frame 6. The intermediate links 46, 47 are substantially V-shaped links interposed between the first link 44 and the second link 45, and operate in response to movement of the second link 45 to operate (swing) the first link 44. In other words, the second link 45 operates the first link 44 through the intermediate links 46, 47.

Movement of the link mechanism 43 is described with reference to FIGS. 5 and 6. When the support portion 20 moves back and forth by advancement/retraction of the extension members 21, the roller portion 10 including the rotary shaft 12 and the first link 44 together move back and forth. When the first link 44 moves back and forth, the intermediate links 46, 47 and the second link 45 operate accordingly. In this state, the intermediate links 46, 47 and the second link 45 each operate such that the first link 44 (in a precise sense, an end portion connected to the intermediate link 46) swings back and forth. Accordingly, the first link 44 operates (swings) to rotate the rotary shaft 12 of the roller portion 10.

Note that in the present embodiment, each link forming the link mechanism 43 is disposed on the outside of the roller portion 10 in the seat width direction, and in a precise sense, is disposed adjacent to the roller portion 10 on one end side in the seat width direction. Of the link mechanism 43, the first link 44 connected to the rotary shaft 12 of the roller portion 10 is disposed lower than an upper end of the roller portion 10, and in a precise sense, is disposed lower than an upper end of the rotary shaft 12. This positional relationship properly suppresses, in the present embodiment, a feeling of seating comfort from diminishing due to contact of the first link 44 with the seated person.

Moreover, in the present embodiment, for the purpose of restricting the operation amount of each link forming the link mechanism 43 from reaching equal to or greater than a certain value, a stopper portion 48 illustrated in FIG. 5 is provided at the seat cushion frame 6. The stopper portion 48 protrudes outward in the seat width direction from a predetermined portion of the seat cushion frame 6. When the second link 45 rotates and reaches one end position of a movable range of the second link 45, a lock portion 45a formed at an end portion of the second link 45 in a longitudinal direction thereof is locked by the above-described stopper portion 48. This restricts further back swing of the second link 45. As a result, rotation of the roller portion 10 including the rotary shaft 12 in the direction of further winding up the pad material 7 and the skin material 8 from a state illustrated in FIG. 5 is restricted.

The cover member 50 is a member configured to cover at least a portion of the roller portion 10 for reducing, for example, adherence of a foreign substance to the roller portion 10. The cover member 50 is in a substantially U-shaped outer shape when viewed from above, and has a front wall portion 51 and a pair of right and left side wall portions 52 as illustrated in FIG. 3. The side wall portions 52 laterally cover side end surfaces of the roller portion 10.

The front wall portion 51 is positioned at the front of the pad material 7 wound around the outer peripheral portion 11 of the roller portion 10, and covers the pad material 7. Note that the front wall portion 51 is disposed slightly lower than the rotary shaft 12 of the roller portion 10 in the upper-to-lower direction. Thus, an upper portion of the roller portion 10 and the pad material 7 wound around the upper portion are positioned higher than the front wall portion 51, and are exposed.

Note that in the present embodiment, the cover member 50 is molded of a resin material, and the front wall portion 51 and the side wall portions 52 are molded together. Moreover, the cover member 50 is fastened to the support portion 20 at a position illustrated in FIG. 2. Specifically, the right and left side wall portions 52 in a pair are, through screws, fixed respectively to the rotary shaft support brackets 23 of the support portion 20. Thus, when the support portion 20 moves back and forth, the cover member 50 moves together with the support portion 20. The cover member 50 moves together with the support portion 20 as described above so that the roller portion 10 can be covered without contact with the support portion 20. Moreover, side end surfaces of the outer peripheral portion 11 of the roller portion 10 are covered with the side wall portions 52 of the cover member 50, and therefore, the side end surfaces of the outer peripheral portion 11 around which the pad material 7 is wound are covered. Thus, the outer appearance of the periphery of the roller portion 10 can be improved.

Figure 8:
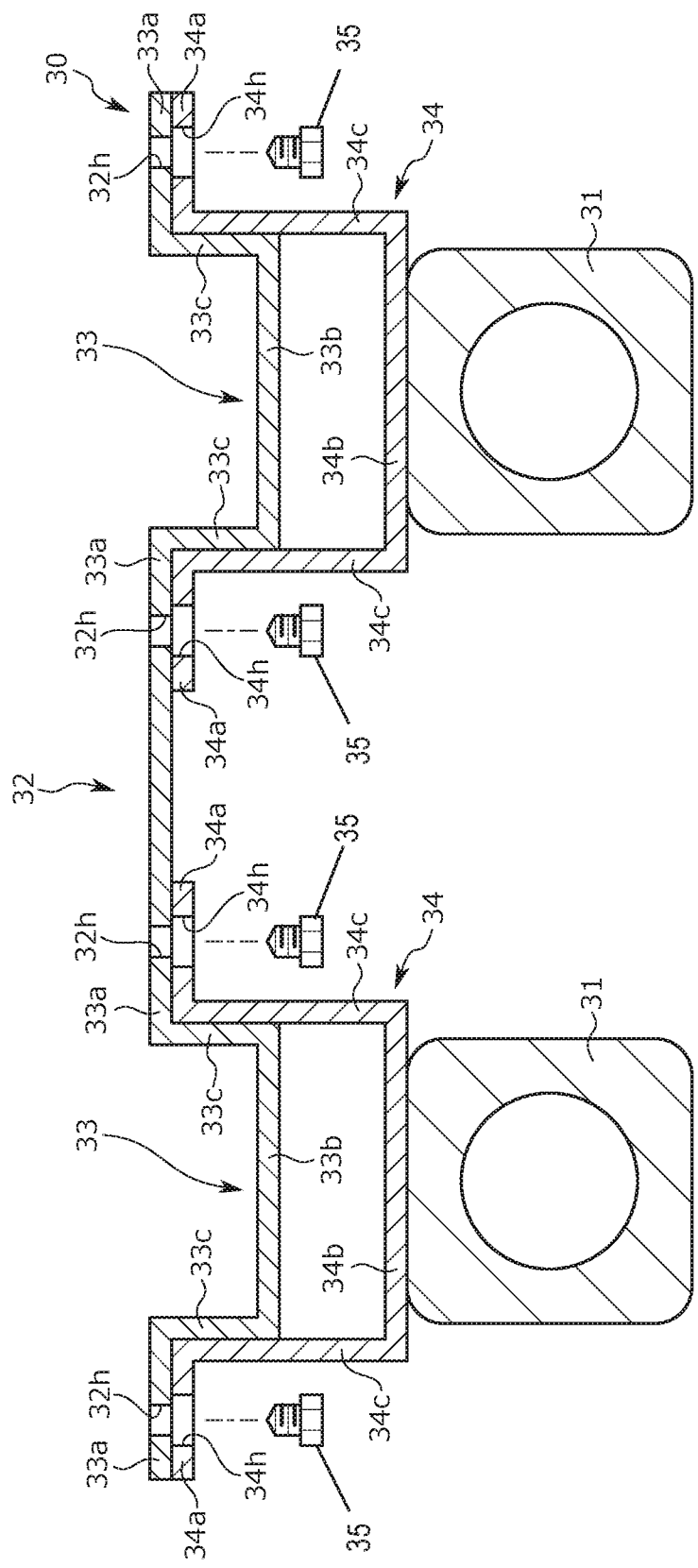
FIG. 8 is a schematic cross-sectional view of a configuration of a holding portion, according to an embodiment.

Next, the above-described configuration of the holding portion 30, specifically the structure for fixing the guide members 31 to the seat cushion frame 6, is described in detail with reference to FIG. 8. FIG. 8 is a schematic cross-sectional view of the configuration of the holding portion, and in a precise sense, is a view of a cross-section cut at intermediate positions of the guide members 31 in a longitudinal direction thereof.

As described above, the guide members 31 are arranged respectively at the positions provided with the extension members 21 in the seat width direction. More specifically, the extension members 21 are provided in a pair at the positions separated from each other in the seat width direction. In addition, the same number of guide members 31 as that of the extension members 21 is provided, and each guide member 31 is, in the seat width direction, disposed at the position of a corresponding one of the extension members 21.

The guide members 31 are coupled together through the coupling member 32 extending along the seat width direction. Specifically, the coupling member 32 includes, at both end portions in an extension direction of the coupling member 32, the guide member fixing portions 33 as illustrated in FIG. 3. Each guide member fixing portion 33 is a portion of the coupling member 32 fixed to a corresponding one of the guide members 31. In the present embodiment, the guide member fixing portion 33 is provided for each guide member 31, and specifically, the guide member fixing portions 33 are provided respectively at positions separated from each other in the seat width direction.

Each guide member fixing portion 33 is now described. Each guide member fixing portion 33 is, as illustrated in FIG. 8, in a substantially inverted hat-like shape (a U-like shape) as viewed from the front. More precisely, each guide member fixing portion 33 includes a plurality of portions as illustrated in FIG. 8, and specifically has first portions 33a, a second portion 33b, and third portions 33c as illustrated in this figure. The first portions 33a are horizontally-extending portions positioned respectively at both end portions of the guide member fixing portion 33 in the seat width direction. The second portion 33b is a horizontally-extending portion sandwiched between the first portions 33a in the seat width direction and positioned lower than the first portions 33a. Each third portion 33c is a vertically-extending portion forming a step portion between the first portion 33a and the second portion 33b. As illustrated in FIG. 8, the guide member 31 is fixed to the second portion 33b of each guide member fixing portion 33.

The reinforcement member 34 overlaps with each guide member fixing portion 33 as illustrated in FIG. 8. The reinforcement member 34 includes a metal plate piece, and is configured to reinforce a portion of the guide member fixing portion 33 that is in contact with the reinforcement member 34. Note that in the present embodiment, the reinforcement member 34 is provided for each guide member fixing portion 33. Moreover, as illustrated in FIG. 8, each reinforcement member 34 is in a substantially inverted hat-like shape (U-like shape) as viewed from the front as in the guide member fixing portion 33. More precisely, the reinforcement member 34 includes a plurality of portions as illustrated in FIG. 8, and specifically has first reinforcement portions 34a, a second reinforcement portion 34b, and third reinforcement portions 34c as illustrated in this figure. The first reinforcement portions 34a are horizontally-extending portions positioned respectively at both end portions of the reinforcement member 34 in the seat width direction. The second reinforcement portion 34b is a horizontally-extending portion sandwiched between the first reinforcement portions 34a in the seat width direction and positioned lower than the first reinforcement portions 34a. Each third reinforcement portion 34c is a vertically-extending portion forming a step portion between the first reinforcement portion 34a and the second reinforcement portion 34b.

As illustrated in FIG. 8, each reinforcement member 34 as described above contacts a corresponding one of the guide member fixing portions 33 with each first portion 33a overlapping with a corresponding one of the first reinforcement portions 34a and each third portion 33c overlapping with a corresponding one of the third reinforcement portions 34c. Since the reinforcement members 34 contact as described above, the strength of each guide member fixing portion 33 is improved. As a result, the fixing state of the guide member 31 at each guide member fixing portion 33 can be stabilized. In the present embodiment, each guide member 31 is fixed to a corresponding one of the guide member fixing portions 33 through a corresponding one of the reinforcement members 34. Specifically, each reinforcement member 34, whose second reinforcement portion 34b is welded to a corresponding one of the guide members 31, is assembled with a corresponding one of the guide member fixing portions 33, and in this manner, each guide member 31 is fixed to a corresponding one of the guide member fixing portions 33.

In the present embodiment, the coupling member 32 is fixed to the seat cushion frame 6, and therefore, the entirety of the holding portion 30 is, including the guide members 31 fixed to the coupling member 32, fixed to the seat cushion frame 6. Moreover, as illustrated in FIG. 8, the coupling member 32 and both of the reinforcement members 34 are together fixed to the seat cushion frame 6. That is, in the present embodiment, the coupling member 32 and both of the reinforcement members 34 are jointly fastened by fasteners 35 penetrating these members, such as screws. More specifically, each of the coupling member 32 and both of the reinforcement members 34 has holes 32h, 34h into which the fasteners 35 are inserted. The coupling member 32 and the reinforcement members 34 are fixed to predetermined portions of the seat cushion frame 6 by the fasteners 35 inserted respectively into the holes 32h, 34h with the holes 32h, 34h of the coupling member 32 and both of the reinforcement members 34 overlapping with each other.

Note that in the present embodiment, the above-described holes 32h, 34h are formed on both sides of each guide member 31 in the seat width direction. More precisely, in the coupling member 32, the hole 32h is formed at each of the first portions 33a provided respectively at both end portions of each guide member fixing portion 33. On the other hand, in each reinforcement member 34, the hole 34h is formed at each of the first reinforcement portions 34a provided respectively at both end portions of the reinforcement member 34. Since the holes 32h, 34h are formed on both sides of the guide member 31 in the seat width direction, the coupling member 32 and the reinforcement members 34 are fixed (fastened) to the seat cushion frame 6 on both sides of each guide member 31. Thus, stiffness of a portion of the coupling member 32 at the periphery of each guide member 31 can be improved. As a result, attachment stiffness of the guide member 31 at the guide member fixing portion 33 of the coupling member 32 is ensured, and therefore, the fixing state of the guide member 31 can be further stabilized.

Further, in the present embodiment, the size of the hole 34h provided at one (in FIG. 8, the reinforcement member 34) of the coupling member 32 or the reinforcement member 34 is larger than that of the hole 32h provided at the other one (in FIG. 8, the coupling member 32) of the coupling member 32 or the reinforcement member 34, and the hole 34h forms a "loose" hole for the fastener 35. With this configuration, the holes 32h, 34h formed at the coupling member 32 and each reinforcement member 34 can be easily aligned with each other. Thus, the process of fixing the coupling member 32 and the reinforcement members 34 to the seat cushion frame 6 is facilitated.

As described above, in the present embodiment, the components of the holding portion 30, specifically the pair of right and left guide members 31, are fixed to the seat cushion frame 6 through the coupling member 32. Thus, the pair of right and left guide members 31 can be fixed to the seat cushion frame 6 all together. Consequently, as compared to the case of fixing the guide members 31 one by one, the process of fixing the guide members 31 can be more efficiently performed. Similarly, when each guide member 31 is detached for, e.g., replacement of the holding portion 30, the coupling member 32 is detached so that the pair of right and left guide members 31 can be detached all together.

Next, an operation example of the adjustment device 9 of the present embodiment is described. Note that a point at which the length of the seat cushion 2 is shortest in an adjustment range thereof, i.e., a point at which the front end of the seat cushion 2 is positioned backmost in a movable area thereof, is hereinafter referred to as a "normal state." Conversely, a point at which the length of the seat cushion 2 is longest in the adjustment range thereof, i.e., a point at which the front end of the seat cushion 2 is positioned foremost in the movable area thereof, is hereinafter referred to as an "extended state."

The roller portion 10, the support portion 20, and the cover member 50 are positioned backmost in movable areas thereof in the normal state. In such a state, when the drive motor 41 is actuated to move the spindle 42 forward, the support portion 20 moves forward. In response, the link mechanism 43 of the drive portion 40 rotates (in a precise sense, rotatably moves) the rotary shaft 12 of the roller portion 10 in a direction indicated by an arrow f1 in FIG. 5. Thus, as a result of rotation of the roller portion 10 in this direction, the amount of winding of each of the pad material 7 and the skin material 8 around the outer peripheral portion 11 of the roller portion 10 changes. Specifically, the pad material 7 and the skin material 8 are reeled out from the outer peripheral portion 11 as illustrated in FIG. 6, and as a result, the winding amount decreases. Accordingly, the front end of the seat cushion 2 moves forward, and a seating surface of the seat cushion 2 is extended forward (i.e., the length of the seat cushion 2 increases).

On the other hand, the roller portion 10, the support portion 20, and the cover member 50 are positioned foremost in the movable areas thereof in the extended state. In such a state, when the drive motor 41 is actuated to move the spindle 42 backward, the support portion 20 moves backward. In response, the link mechanism 43 of the drive portion 40 rotates (in a precise sense, rotatably moves) the rotary shaft 12 of the roller portion 10 in a direction indicated by an arrow f2 in FIG. 5. Thus, as a result of rotation of the roller portion 10 in this direction, the amount of winding of each of the pad material 7 and the skin material 8 around the outer peripheral portion 11 of the roller portion 10 changes. Specifically, the pad material 7 and the skin material 8 are wound up by the outer peripheral portion 11 as illustrated in FIG. 5, and as a result, the winding amount increases. Accordingly, the front end of the seat cushion 2 moves backward, and the seating surface of the seat cushion 2 is narrowed in the front-to-back direction (i.e., the length of the seat cushion 2 decreases).

As described above, in the vehicle seat 1 of the present embodiment, the pad material 7 and the skin material 8 are wound around the outer peripheral portion 11 of the roller portion 10 at the front end portion of the seat cushion 2. Moreover, when the cushion front end portion is moved, the amount of winding of each of the pad material 7 and the skin material 8 around the outer peripheral portion 11 is changed by rotation of the roller portion 10. Moreover, in the present embodiment, the outer peripheral portion 11 is made of the soft material, specifically the resin foam such as urethane. Thus, in the case of changing the winding amount (in a precise sense, increasing the winding amount), the pad material 7 can be favorably wound up by friction force generated between the outer peripheral portion 11 and the pad material 7. As a result, a favorable outer appearance of the roller portion 10 around which the pad material 7 is wound is achieved.

Normally, the lower thighs of the seated person are placed on the front end portion of the seat cushion 2. In the present embodiment, the outer peripheral portion 11 of the roller portion 10 disposed in the front end portion of the seat cushion 2 is made of the soft material as described above.

Thus, when the lower thighs of the seated person are placed on the front end portion of the seat cushion 2, the front end portion of the seat cushion 2 is pressed against the lower thighs of the seated person with a soft contact force. As a result, the seated person has a favorable feeling of seating comfort.

Figure 9:
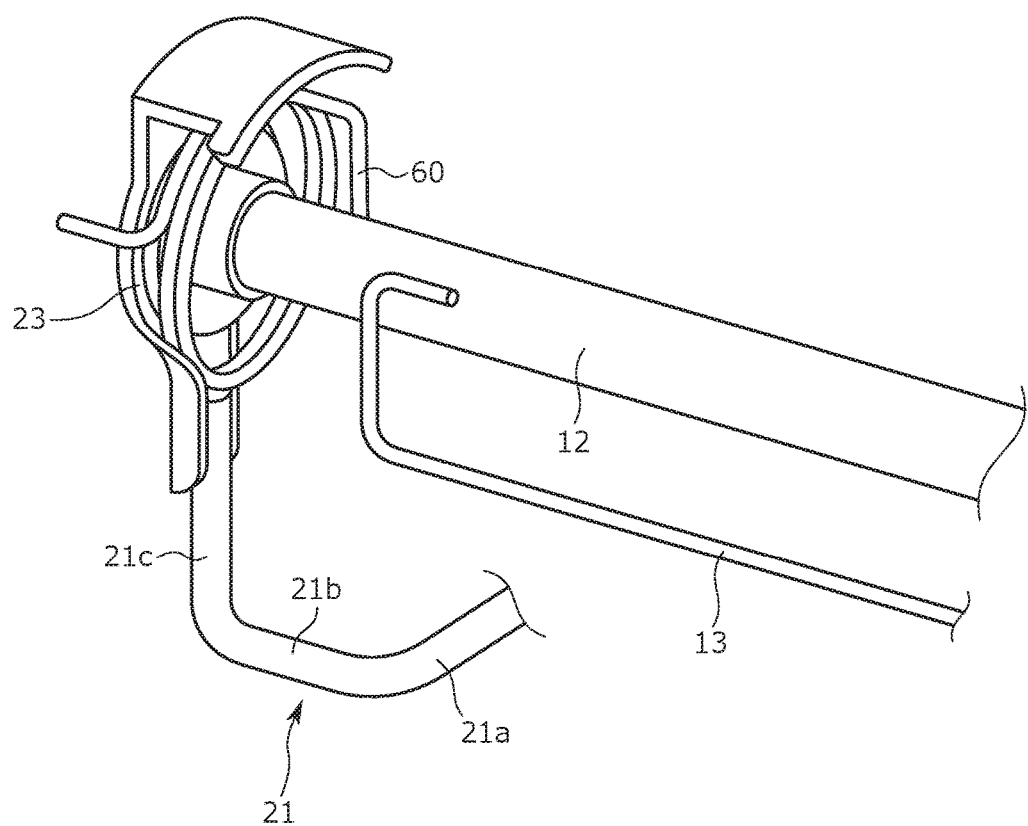
FIG. 9 is a partial, perspective view of a configuration provided with a biasing member, according to an embodiment.

The example of the configuration of the adjustment device 9 has been described above, but the present disclosure is not limited to the above-described embodiment. Other embodiments are also conceivable. For example, for the purpose of providing proper tension to the pad material 7 and the skin material 8 wound around the outer peripheral portion 11 of the roller portion 10, a biasing member 60 illustrated in FIG. 9 may be further provided in the adjustment device 9. FIG. 9 is a partial, perspective view of a configuration provided with the biasing member 60, and in a precise sense, is a view of a peripheral structure of the biasing member 60. Note that in FIG. 9, only a portion of the periphery of the biasing member 60 is illustrated for the sake of convenience of illustration of the biasing member 60, and the outer peripheral portion 11 of the roller portion 10 is not shown in the figure.

The above-described biasing member 60 includes a volute spring. One end of the biasing member 60 is held at the rotary shaft support bracket 23, and the other end of the biasing member 60 is held at the rotary shaft 12 of the roller portion 10. The biasing member 60 set in such a state biases, in the rotation direction of the roller portion 10, the roller portion 10 in the direction (the direction indicated by the arrow f2 in FIG. 5) of increasing the amount of winding of each of the pad material 7 and the skin material 8. Since the roller portion 10 is biased as described above, the pad material 7 and the skin material 8 wound around the outer peripheral portion 11 are moderately pulled, leading to a favorable outer appearance of the front end portion of the seat cushion 2.

TABLE OF REFERENCE NUMERALS

| | |
|---|---|
| 1: | vehicle seat (conveyance seat) |
| 2: | seat cushion |
| 3: | seat back |
| 4: | head rest |
| 5: | slide rail mechanism |
| 6: | seat cushion frame (frame) |
| 7: | pad material |
| 8: | skin material |
| | 8a: end portion |
| | 8b: trim loop |
| 9: | adjustment device |
| 10: | roller portion |
| 11: | outer peripheral portion |
| 12: | rotary shaft |
| 13: | skin fixing portion |
| 20: | support portion (movable portion) |
| 21: | extension member |
| | 21a: body portion |
| | 21b: horizontal portion |
| | 21c: vertical portion |
| 22: | communication member |
| 23: | rotary shaft support bracket |
| 30: | holding portion |
| 31: | guide member |
| 32: | coupling member |
| | 32h: hole |
| 33: | guide member fixing portion |
| | 33a: first portion |
| | 33b: second portion |
| | 33c: third portion |
| 34: | reinforcement member |
| | 34a: first reinforcement portion |
| | 34b: second reinforcement portion |

-continued

TABLE OF REFERENCE NUMERALS

| | |
|---|---|
| | 34c: third reinforcement portion |
| | 34h: hole |
| 40: | drive portion |
| 41: | drive motor |
| 42: | spindle |
| 43: | link mechanism |
| 44: | first link |
| 45: | second link |
| | 45a: lock portion |
| 46, 47: | intermediate link |
| 48: | stopper portion |
| 50: | cover member |
| 51: | front wall portion |
| 52: | side wall portion |
| 60: | biasing member |

The invention claimed is:

1. A conveyance seat comprising:
a seat cushion having a pad material placed on a frame; and
an adjustment device configured to move a front end of the seat cushion to adjust a length of the seat cushion in a front-to-back direction;
wherein the adjustment device has
a support portion attached to be movable relative to the frame in the front-to-back direction, and
a roller portion rotatably supported by the support portion and configured such that the pad material is wound around an outer peripheral portion of the roller portion at a front end portion of the seat cushion;
wherein the length of the seat cushion is adjustable by a change in an amount of winding of the pad material around the outer peripheral portion corresponding to a rotation of the roller portion during movement of the support portion in the front-to-back direction; and
wherein the outer peripheral portion is made of a soft material;
wherein the adjustment device has a link mechanism configured to rotate the roller portion in response to movement of the support portion;
wherein the link mechanism has
a first link connected to a rotary shaft of the roller portion and configured to rotate the rotary shaft, and
a second link configured to, in association with the movement of the support portion, operate the first link to rotate the rotary shaft.

2. The conveyance seat of claim 1, wherein
the outer peripheral portion is made of resin foam as the soft material.

3. The conveyance seat of claim 1, wherein
the first link is disposed lower than an upper end of the roller portion.

4. The conveyance seat of claim 3, wherein
the first link is disposed lower than an upper end of the rotary shaft.

5. The conveyance seat of claim 1, wherein
the seat cushion has a skin material configured to cover the pad material,
the roller portion is configured such that the pad material and the skin material are wound around the outer peripheral portion at the front end portion, and
a skin fixing portion for fixing an end portion of the skin material is attached to a rotary shaft of the roller portion.

6. The conveyance seat of claim 5, wherein
the skin fixing portion is a wire provided for fixing the end portion with the end portion being hooked, and
the wire is disposed lower than the rotary shaft.

7. The conveyance seat of claim 1, wherein
the adjustment device has a biasing member configured to bias, in a rotation direction of the roller portion, the roller portion in a direction of increasing the amount of winding of the pad material around the outer peripheral portion.

8. The conveyance seat of claim 1, wherein
the adjustment device has a cover member configured to cover at least a portion of the roller portion, and
the cover member is fastened to the support portion, and is movable together with the support portion when the support portion moves.

9. The conveyance seat of claim 8, wherein
the cover member has
   a front wall portion positioned at a front of the pad material wound around the outer peripheral portion and covering the pad material, and
   a side wall portion that laterally covers a side end surface of the roller portion.

10. A conveyance seat comprising:
a seat cushion having a pad material placed on a frame; and
an adjustment device configured to move a front end of the seat cushion to adjust a length of the seat cushion in a front-to-back direction;
wherein the adjustment device has
   a support portion attached to be movable relative to the frame in the front-to-back direction, and
   a roller portion rotatably supported by the support portion and configured such that the pad material is wound around an outer peripheral portion of the roller portion at a front end portion of the seat cushion;
wherein the length of the seat cushion is adjustable by a change in an amount of winding of the pad material around the outer peripheral portion corresponding to a rotation of the roller portion during movement of the support portion in the front-to-back direction; and
wherein the outer peripheral portion is made of a soft material;
wherein the adjustment device has a cover member configured to cover at least a portion of the roller portion, and the cover member is fastened to the support portion, and is movable together with the support portion when the support portion moves;
wherein the cover member has
   a front wall portion positioned at a front of the pad material wound around the outer peripheral portion and covering the pad material, and
   a side wall portion that laterally covers a side end surface of the roller portion.

11. A conveyance seat comprising:
a seat cushion having a pad material placed on a frame; and
an adjustment device configured to move a front end of the seat cushion to adjust a length of the seat cushion in a front-to-back direction;
wherein the adjustment device has
   a support portion attached to be movable relative to the frame in the front-to-back direction, and
   a roller portion rotatably supported by the support portion and configured such that the pad material is wound around an outer peripheral portion of the roller portion at a front end portion of the seat cushion;
wherein the length of the seat cushion is adjustable by a change in an amount of winding of the pad material around the outer peripheral portion corresponding to a rotation of the roller portion during movement of the support portion in the front-to-back direction; and
wherein the outer peripheral portion is made of a soft material;
wherein the seat cushion has a skin material configured to cover the pad material, the roller portion is configured such that the pad material and the skin material are wound around the outer peripheral portion at the front end portion, and a skin fixing portion for fixing an end portion of the skin material is attached to a rotary shaft of the roller portion.

* * * * *